Aug. 21, 1951  J. A. PAASCHE  2,565,263
AUTOMATIC COATING MACHINE
Filed May 21, 1949  4 Sheets-Sheet 4
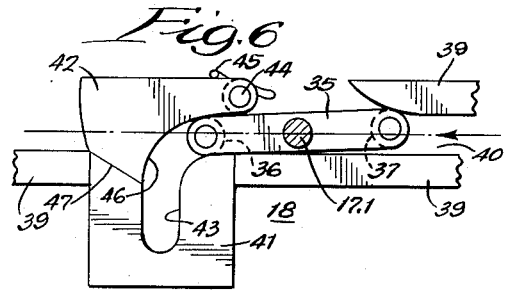
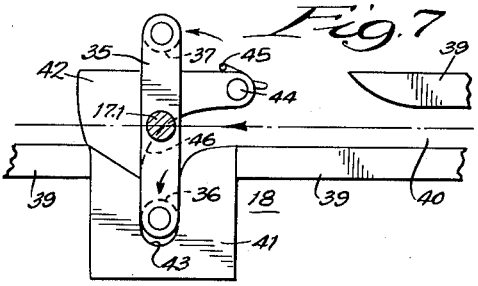
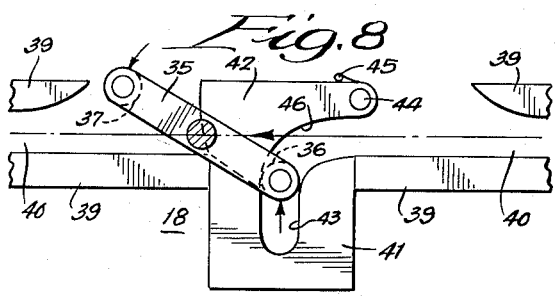
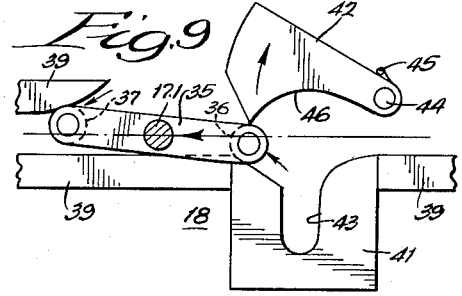
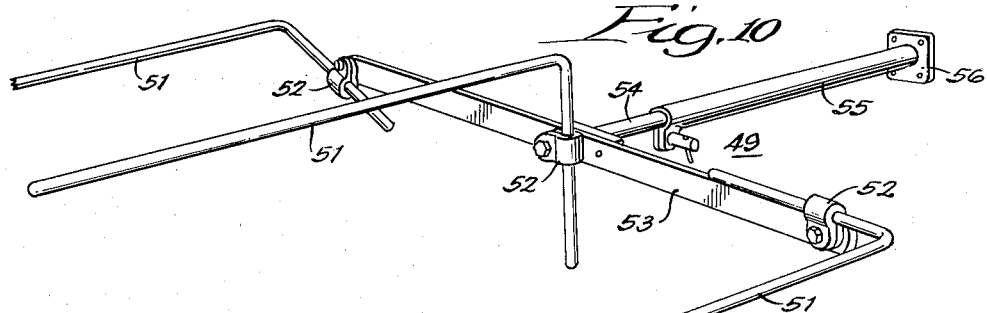
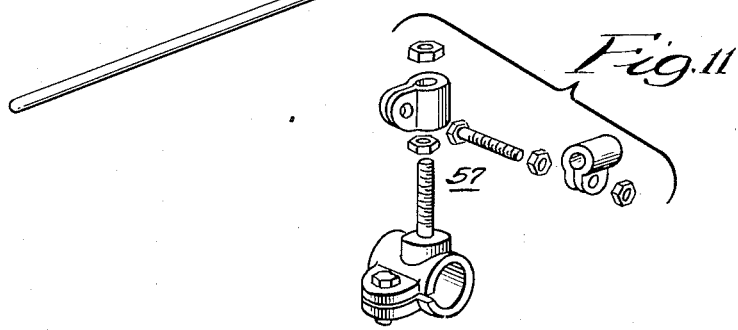
INVENTOR:
Jens A. Paasche,
BY
ATTORNEYS.

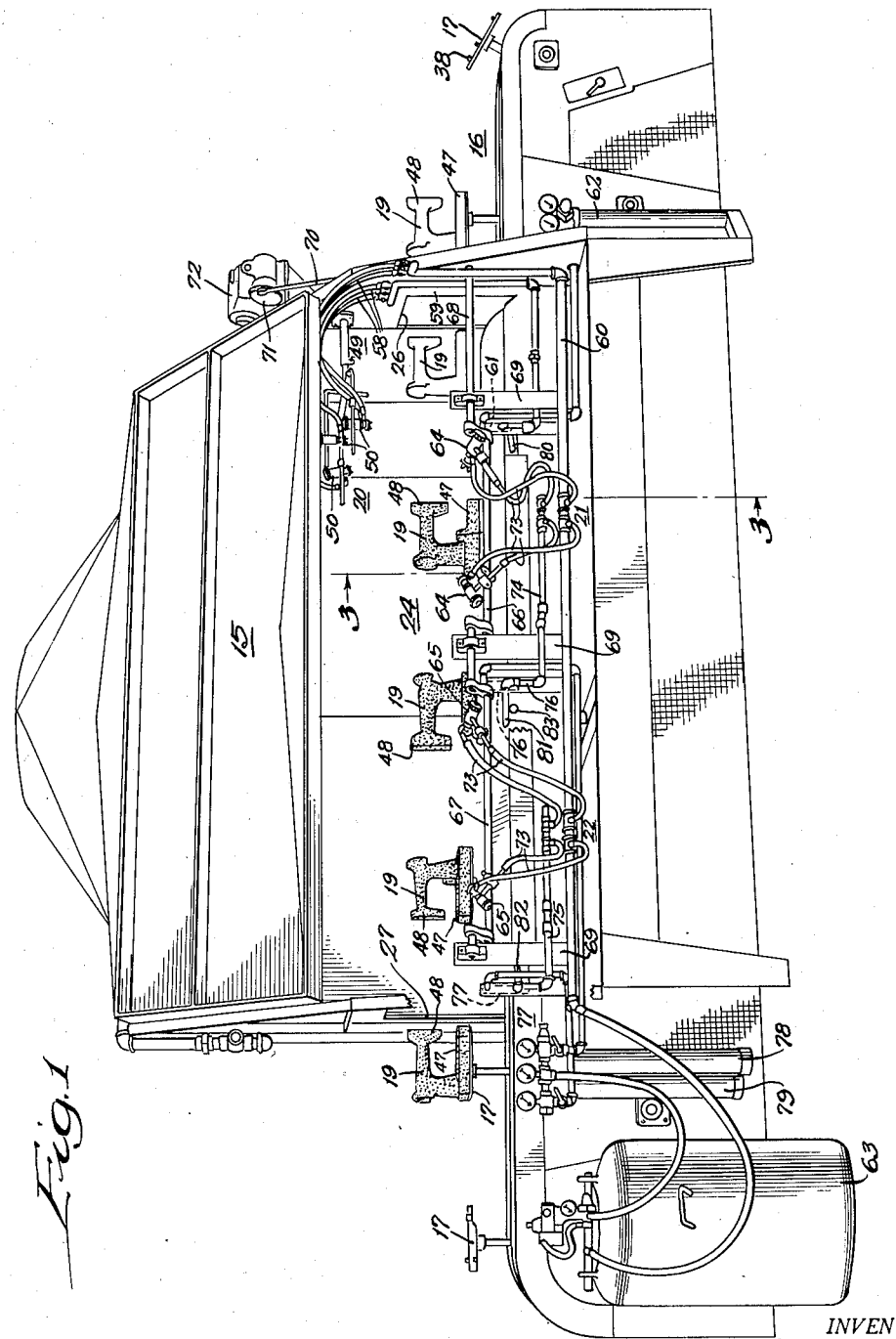

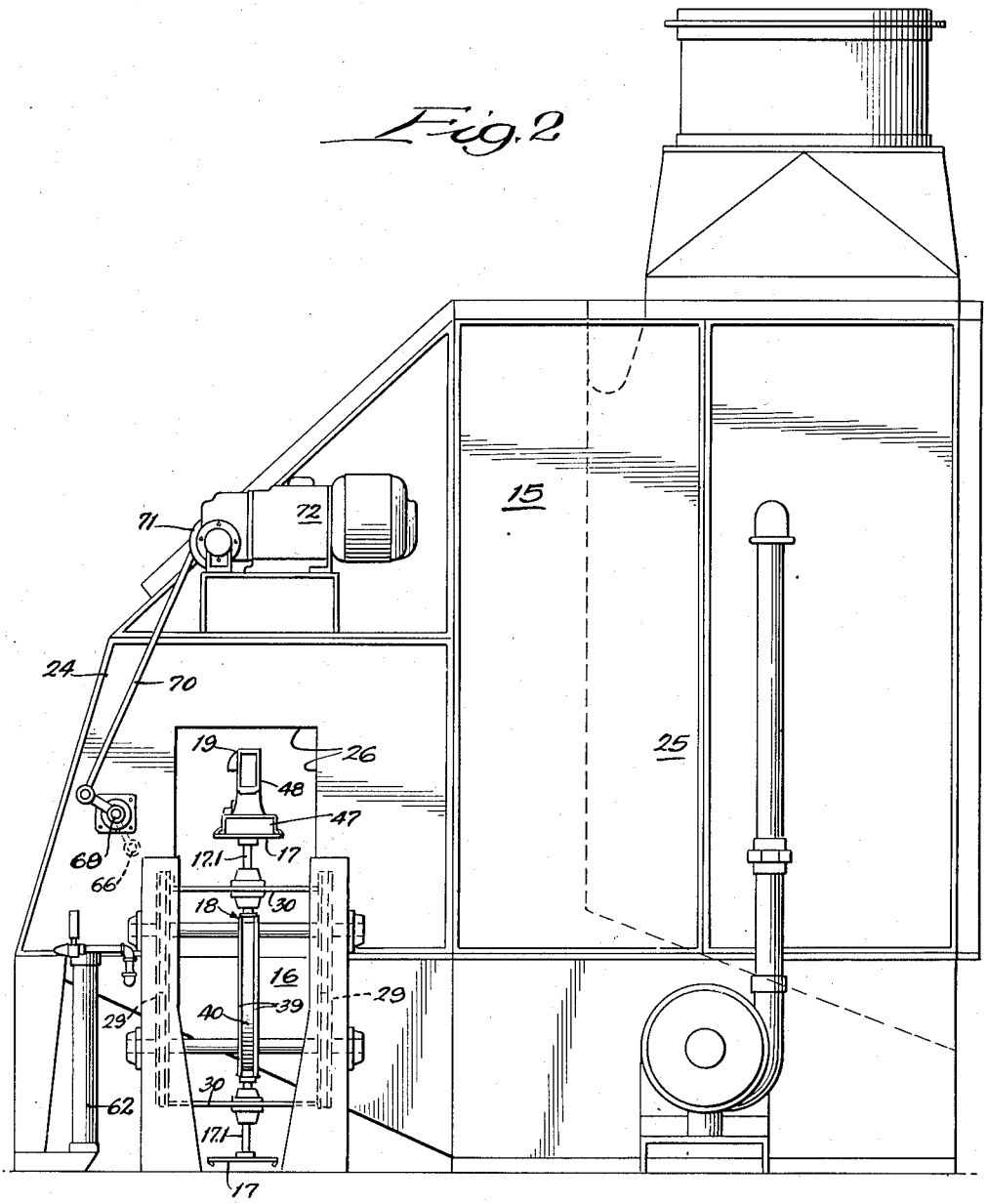

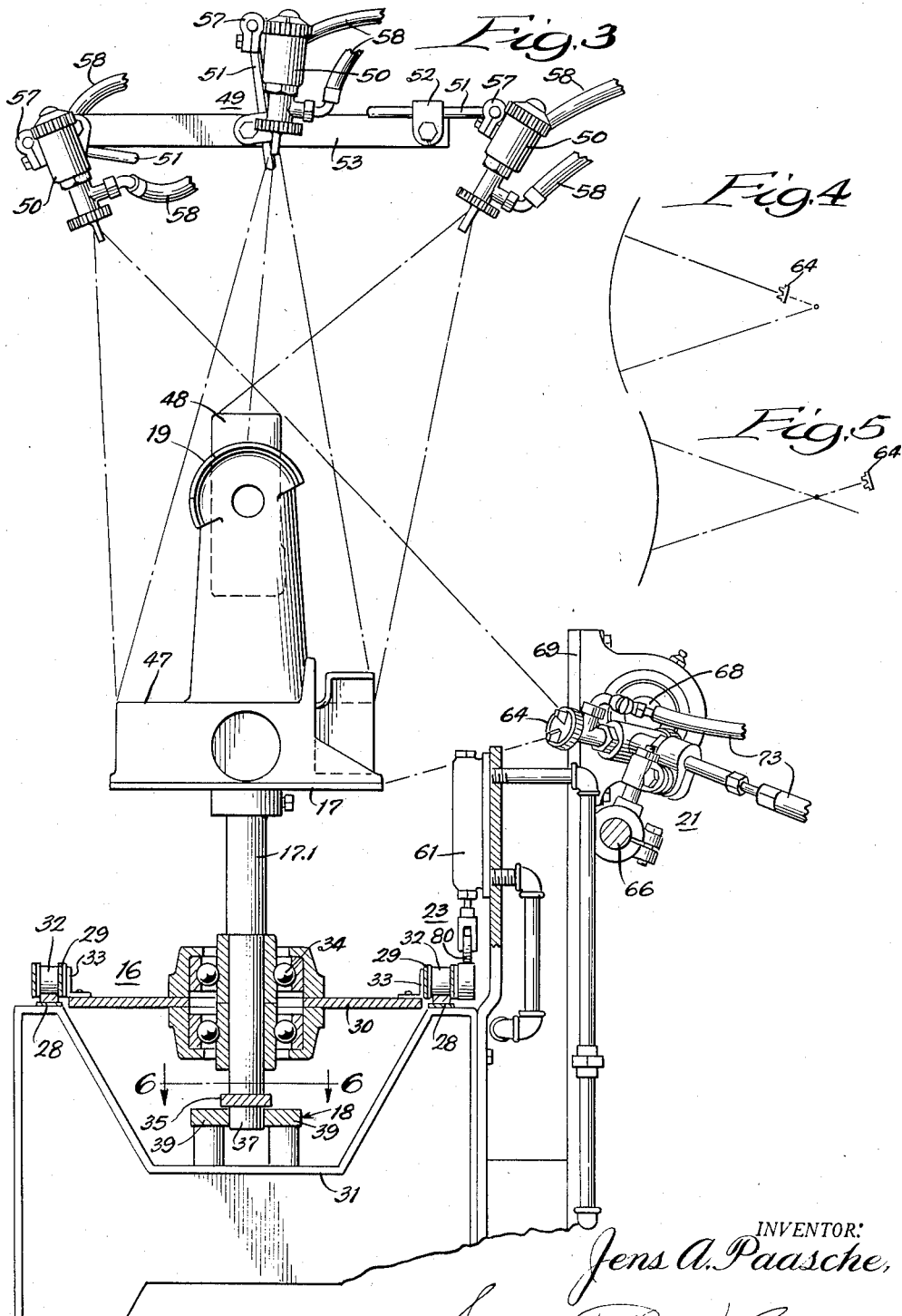

Patented Aug. 21, 1951

2,565,263

UNITED STATES PATENT OFFICE 2,565,263

AUTOMATIC COATING MACHINE

Jens A. Paasche, Wilmette, Ill.

Application May 21, 1949, Serial No. 94,672

10 Claims. (Cl. 91—45)

This invention relates to airpainting machines, particularly of the type used for applying a coat of paint, varnish, enamel, lacquer, or other material, on objects moving on a conveyor.

In airpainting an object with paint, varnish, enamel, lacquer, or the like, it is important to secure as even and uniform an application as possible of the coating material over all irregularly shaped parts of the object. When these objects are on a conveyor moving past an automatically-controlled airpainting station, the securing of such an even and uniform coating depends upon several interrelated factors. If these objects have irregularly-curved, superimposed, and angularly-arranged surfaces, these interrelated factors become very important in securing the desired uniform and even coating.

The main objects of this invention, therefore, are to provide an improved form of airpainting or coating machine for applying paints, varnishes, enamels, lacquers, or other materials, to various types and forms of objects of manufacture; to provide an improved mounting and means for actuating the airbrushes used in the machines so as to secure the most effective coverage of the entire surface of the objects to be coated; to provide improved mechanism for reciprocating the airbrushes so as to spread the coating material completely and uniformly over all surfaces of each object regardless of the curved, angular, or superimposed arrangement of its surfaces; to provide improved means for so positioning the airbrushes on a rocking mechanism as will assure their reciprocation through an arc approximating the curvature of the surface to be coated; to provide the conveyor mechanism used for moving objects past one or more airbrush stations with improved means for turning the objects 180 degrees so as to successively expose the opposite faces of each object to the airbrushes; to provide improved means actuatable by the conveyor mechanism for disabling the airbrushes during the turning of the objects; and to provide an improved machine of this kind which is compact, simple in the construction of its several parts, and highly effective in operation.

In the accompanying drawings:

Fig. 1 is a perspective view of a preferred machine embodying this invention constructed for use in applying liquid coatings on various forms of objects of manufacture;

Fig. 2 is a side elevation of the same;

Fig. 3 is an enlarged vertical, partly sectional, partly elevational view of the overhead airpainting mechanism, taken on the line 3—3 of Fig. 1;

Figs. 4 and 5 are diagrammatic views illustrating how the reciprocating airbrushes are positionable so that the arc of reciprocation substantially conforms to the concave or convex contour of the surfaces of the objects to be coated;

Figs. 6, 7, 8, and 9 are enlarged fragmentary details of the cam and cam track mechanism whereby object-carrying platforms are given two 180-degree rotations in order, first, to expose the opposite surfaces of the objects to the two airpainting stations; and second, to return the platforms to their normal positions. The figures are taken on the line 6—6 of Fig. 3;

Fig. 10 is an enlarged perspective view of the airbrush-supporting bracket for mounting the airbrushes for the overhead airpainting station, which is most clearly shown in Figs. 1 and 3; and Fig. 11 is a blown-up view of the universal mounting whereby the airbrushes are adjustably attached on their respective supports.

The herein-shown preferred embodiment of a coating-machine, constructed in accordance with this invention, comprises a supporting framework or housing 15 wherewith is associated a conveyor 16 for moving object-supporting platforms 17 through a predetermined path and revolving them in the course of their travel by the action of cam and cam track mechanism 18 to permit the objects 19 to be coated on all exposed surfaces through the combined action of the airbrushes at an overhead painting station 20 and at the two side painting stations 21 and 22, the action of the airbrushes at the several stations being controlled by valve mechanisms 23 arranged along the path of the conveyor 16.

The housing 15 is a sheet metal construction providing an airpainting chamber 24 in association with a water-wash booth 25 (see Fig. 2). The latter is equipped with suitable means for drawing off the overspray and washing the particles of coating material from the air currents and directing them into a settling tank.

The painting or atomizing chamber 24 is open at the front and at the ends thereof, the housing 15 being provided with openings 26 and 27 through which the objects 19 on the platforms 17 enter and exit from the chamber 24.

The conveyor 16 comprises tracks 28 upon which travel the link belts 29 which are spanned by and whereto are connected plates 30, whereon are supported the rotatable platforms 17. A suitable source of power, preferably an electric motor (not shown), is provided for operating the conveyor 16.

The tracks 28 are supported along the upper opposite edges of a V-shaped frame 31, the base of which provides a support for the rails of the cam and cam track mechanism 18. The link belts 29 are, of course, provided with suitable rollers 32 which travel on the tracks 28. The plates 30 are secured at their ends to the links 29 by angle brackets 33.

Each of the platforms 17 is secured to the upper end of a shaft 17.1 supported on a roller bearing 34 mounted on a plate 30. At the lower end of the shaft 17.1 is secured an arm 35 supporting rollers 36 and 37 at its opposite ends, which rollers travel along the hereinafter-described cam tracks and effect the rotation of the platforms 17, as will be subsequently explained.

Each of the platforms 17 is provided with prongs or shoulders 38 (see Fig. 1) for holding an object 19 in place during its travel through the airpainting chamber 24.

The cam and cam track mechanism 18, comprises the aforesaid roller-mounting arms 35 and a pair of rails 39 which are coextensive with the conveyor 16. These rails 39 provide a guideway 40 for the rollers 36 and 37. At two points along their upper sections the rails 39 are intersected by a plate 41 and a pawl 42 which coact to form transverse branches 43 to the guideway 40 and into which the rollers 35 and 36 are diverted, during the movement of the conveyor 16, to effect the desired rotation of the platforms 17. One plate 41 and pawl 42 are located about mid-way of the painting chamber 24 and between the airpainting stations 21 and 22. Another plate 41 and pawl 42 are located adjacent the left-hand end of the painting chamber 24 near the exit 27.

The plate 41 for each of these diverting branch guideways 43, is fixed whereas the pawl 42 is pivoted at 44 and urged by a spring 45 so that its cam surface 46 extends across the guideway 40. Coacting shoulders 47 on the plate 41 and pawl 42 position the pawl 42 so that its cam surface 46 is positioned to direct a roller into the branch guideway 43.

Figs. 6, 7, 8, and 9 show the consecutive relationships of the roller-supporting arm 35 and a retractable pawl 42 as they effect the turning of the platforms 17 at two points during their travel through the painting chamber 24.

The objects 19 which, in the course of time, may be carried by the platform 17 for air coating, of course, will be of varied shapes. The objects herein-shown are sewing machine heads. As is apparent from the drawings, each comprises a base 47 and a vertically-spaced arm 48. These parts present horizontal and vertical surfaces that have to be coated by the combined functioning of the airbrushes at the painting stations 20, 21, and 22. Moreover, some of the surfaces are both convex and concave, which presents a special problem in uniform and even coating.

The airbrushes for the three airpainting stations 20, 21, and 22 are of the same form, construction, and operation as those set forth in Paasche Patent No. 2,401,503, issued June 4, 1946.

For the overhead airpainting station 20 a bracket 49 supports three airbrushes 50 somewhat inwardly of the conveyor entrance 26.

The bracket 49, as most clearly shown in Fig. 10, comprises rods 51 adjustably supported in clamps 52 carried by an arm 53 which is secured to a rod or post 54 telescopically clamped in a tube 55. A plate 56, at the inner end of the tube 55, provides for attachment of the bracket 49 to the side of the housing 15. An airbrush 50 is adjustably supported on each of the rods 51 by a universal clamp 57 (see Fig. 11). Such an arrangement of the rods 51, the telescoping members 54 and 55, and the clamps 57, in addition to the spray-adjusting construction of the airbrushes themselves, permit the airbrushes 50 to be so focused on the objects 19 as to coact with the airbrushes for airpainting stations 21 and 22 in securing the most effective results in the coating of the objects 19.

The airbrushes 50 for the overhead airpainting station 20 are connected by flexible tubes 58 to an air line 59 and to a coating material supply line 60 (see Fig. 1). The air line 59 is provided with a valve mechanism 61 (see Fig. 3) located adjacent the path of travel of the conveyor 16 and also has interposed therein an air conditioner 62 for extracting oil, water, and solid particles from the air. The coating supply line 60 leads to a source 63 of coating material (see Fig. 1).

The two side airpainting stations 21 and 22 are practically identical. Each includes a pair of automatic airbrushes 64 and 65, respectively, of the type shown in the aforesaid Patent No. 2,401,503, mounted on crank rods 66 and 67, respectively, connected to a three-piece rock shaft 68 journaled on standards 69 parallel with the path of the conveyor 16. At its right-hand end the rock shaft 68 is connected by a pitman 70 to a stroke-adjusting disk crank 71 which is driven by a motor 72.

The automatic airbrushes 64 and 65 are adjustably secured to the respective crank rods 66 and 67 by clamps, such as shown at 57 in Fig. 11, and as most clearly shown in Fig. 1, are spaced apart in the direction of the travel of the conveyor 16 with their atomizing axes converging on an object 19 to be coated. Thus, one of the pairs of airbrushes 64 and 65 has its spray directed toward the advancing surface of an object 19, whereas the other airbrush of each pair has its spray directed toward the trailing surface of the object. The airbrushes for painting station 21 coat one side of an object 19, whereas the airbrushes for painting station 22 coat the opposite side of the object, the object being turned 180 degrees between the two stations, as hereinbefore explained.

By reason of the universal clamps 57 (see Fig. 11) the airbrushes 64 and 65 may be not only angularly-disposed with respect to the object 19 to be coated, but also may be set concentrically of the axis of the rock shaft 68 or eccentrically forwardly or rearwardly of said rock shaft axis. This makes possible the positioning of the airbrush orifices so that they will travel through arcs substantially parallel or concentric with the concave or convex character of the surfaces of the object 19 to be coated (see Figs. 4 and 5). Thus, the distance between the atomizing orifices and the surfaces of an article 19 remains practically constant throughout the reciprocating movement of the sprays. This insures a more even coating of the material on the objects than has heretofore been possible.

The airbrushes 64 and 65 are connected by suitable flexible tubing 73 to air lines 74 and 75, respectively, and to the coating supply line 60.

The air line 74 has a valve mechanism 76 and the air line 75 has a valve mechanism 77, of a type more clearly shown at 61 in Fig. 3, both arranged adjacent the path of the conveyor 16. The air lines 74 and 75 are connected to a source of air pressure through suitable air conditioners 78 and 79, respectively.

Associated with the respective valve mechanisms 61, 76, and 77 are trip levers 80, 81, and 82 which are actuated by rollers 83 on the conveyor 16 to cut off or disable the airbrushes 50, 64, and 65, respectively, at times when the objects 19 are not in the most suitable positions for painting. A roller 83 is positioned on the conveyor 16 adjacent each of the platforms 17, so that in view of the positioning of the respective levers 80, 81, and 82, these levers are actuated at the appropriate point in the advance of an object 19 through the painting chamber 24 to cut off or disable the respective airbrushes. For the overhead airpainting station 20, that brief period is when one object 19 is passing beyond the effective reach of the airbrushes 50 and as the next object 19 is approaching the overhead spray. For the side airpainting stations 21 and 22 that cut-off is during a very brief period when the objects are being rotated between these painting stations and beyond the latter.

The operation of this preferred embodiment of a coating machine is substantially as follows:

Objects 19 are placed one at a time upon the platforms 17 as they come into horizontal position at the right-hand end of the housing 15. One at a time they are suitably removed from the platforms after painting and after they have passed through the exit 27 from the painting chamber 24.

As an object 19 approaches the overhead airpainting station 20, the lever 80, which controls the valve mechanism 61 for the air line leading to the airbrushes 50, is released and the airbrushes 50 apply material on the more or less horizontal surfaces of the object 19. As will be most clear from Fig. 3, the outside airbrushes 50 are positioned and adjusted particularly to coat the base 47, and especially that portion lying directly under the head 48. The middle airbrush 50 is positioned and adjusted to especially coat the upper surface of the head 48. Of necessity, this paint supplements to an extent the paint from the outside airbrushes. How much this is so, of course, depends upon the adjustment of the valve mechanism for the middle airbrush.

As an object approaches the respective side airpainting stations 21 and 22, the levers 81 and 82 controlling the air-line valve mechanisms for the pair of airbrushes 64 and 65, are released. The left-hand airbrushes 64 and 65 direct their paint primarily against the advancing surfaces of the objects; whereas the right-hand airbrushes 64 and 65 direct their paint primarily against the trailing surfaces of the objects 19.

As an object 19 moves beyond the effective reach of the airpainting station 21 the roller 36 on the arm 35, connected to the shaft 17.1 of the platform 17 supporting that object, contacts the cam surface 46 of the pawl 42 (see Fig. 6). This forces the roller 36 to move into the branch 43, as shown in Fig. 7, with a consequent turning of the platform 90 degrees. The continued movement of the conveyor 16 requires the arm 35 to continue its swinging action, thereby continuing the rotation of the platform 17 and causing the trailing roller 37 to approach the guideway 40 beyond the retractable pawl 42, as shown in Fig. 8. The advance of the conveyor being unchecked, the roller 36 moves out of the branch guideway 43 and retracts the pawl 42 against the action of the spring 45, as shown in Fig. 9. Thereupon, the article 19 has been turned a full 180 degrees so that the opposite face thereof is in position to be coated by the airbrushes at painting station 22.

As each object passes beyond the effective reach of the second side painting station 22, which is practically simultaneous with the passing of a following object 19 beyond the effective reach of painting station 21, the second pawl 42 coacts with the rollers on an arm 35 to again rotate the supporting platform 180 degrees, thereby restoring it to its normal position for receiving another object, as such platform again approaches the entrance 26 to the airpainting chamber 24. This second turning of each platform 17 occurs as the platform approaches the exit opening 27 from the painting chamber 24.

During the travel of the conveyor 16, the airbrushes 64 and 65 are being constantly reciprocated up and down so that the axes of the sprays are traversing an arc substantially equal to the vertical dimension of the objects 19. This ensures an even and uniform application of the coating material on the objects 19.

If, as in the case of the particular objects 19 herein shown, the side surfaces are more or less convex, the airbrushes 64 and 65 may be so adjusted on the respective crank rods 66 and 67 that the atomizing orifices are rearwardly of the axis of the rock shaft 68. Thus, as diagrammatically shown in Fig. 5, the airbrushes 64 and 65 move through arcs which are more or less concentric with the arcuate character of the surface being airpainted. This means that the distance from the atomizing orifices to the surface of the object is substantially the same throughout the total range of reciprocation of the axes of the sprays.

If, at other times the objects to be airpainted have a concave surface, the airbrushes 64 and 65 can be adjusted on the respective crank rods 66 and 67 forwardly of the axis of the crank shaft 68. Thus, as diagrammatically shown in Fig. 4, the airbrushes would be moving through arcs substantially concentric with the concave character of the surface being airpainted. Here, also, the distances between the atomizing orifices and the surfaces being airpainted are practically constant throughout the range of reciprocation of the axes of the sprays. Such adjustment of the airbrushes further ensures securing an even and uniform spread of the coating.

It will be understood, of course, that in addition to adjusting the angularity of the airbrushes 50, 64, and 65 with respect to the object being airpainted, the character of each spray can be altered by an adjustment of the airbrush valve mechanism, as set forth in the aforesaid Patent No. 2,401,503.

Although but one specific embodiment of this invention has been herein shown and described, it will be understood that details of the construction shown may be altered or omitted without departing from the spirit of the invention as defined by the following claims.

I claim:

1. In a machine for air coating objects, the combination of a supporting framework, airbrushes arranged to provide two painting stations, an endless conveyor for moving objects past said painting stations, platforms rotatably mounted on said conveyor for supporting articles to be moved past said painting stations, crank means on each of said platforms for causing rotation thereof, means on said framework for actuating said crank means, said actuating means being located at a point in the interval of passage between said painting stations and a second actuating means on said framework positioned at a point beyond the second painting station passed by said objects, said actuating means successively turning each of said platforms 180 degrees between said painting stations and again beyond said second painting station whereby the opposite sides of each object are successively exposed to the painting action of said stations and each platform is returned to its initial position for subsequently receiving another object, valve mechanisms arranged along the path of said conveyor for separately controlling the airbrushes for each of said painting stations, and means on said conveyor for actuating said valve mechanisms so as to disable the respective air-brushes when said platforms are being turned.

2. In a machine for air coating objects, the combination of a supporting framework, airbrushes positioned at spaced points, a conveyor for moving objects past said airbrushes, platforms for supporting articles to be coated rotatably mounted at intervals on said conveyor, a cam guideway paralleling said conveyor and having a transverse branch intermediate said airbrushes, a cam connected to each of said platforms and adapted to contact said guideway to normally hold said platforms against rotation, a pawl arranged adjacent said transverse branch and normally positioned to engage the advancing edge of each of said cams and divert them into said transverse branch so as to initiate the turning of the respective platforms, said pawl being subsequently engageable with the trailing edge of each cam so as to successively effect a 180-degree turning of said platform and retraction of said pawl incident to the uninterrupted movement of said conveyor.

3. In a machine for air coating objects, the combination of a supporting framework, airbrushes positioned at spaced points, a conveyor for moving objects past said airbrushes, platforms for supporting articles to be coated fixed on shafts rotatably mounted at intervals on said conveyor, a cam guideway paralleling said conveyor and having a transverse branch intermediate said airbrushes, an arm on each of said platform shafts having a roller journaled at each end, said rollers engaging said guideway to normally hold the respective platforms against rotation during their travel through said chamber, and a retractable pawl arranged adjacent said transverse branch and normally positioned to engage the roller on the advancing end of said arm and divert it into said transverse branch so as to effect a 90-degree rotation of said platform, said pawl subsequently engaging the roller on the trailing end of said arm so as to complete the 180-degree rotation of said platform, said pawl being retractable by the pull of said trailing roller as said advancing roller re-enters said guideway incident to the uninterrupted movement of said conveyor.

4. In a machine for air coating irregularly shaped objects, the combination of a moving, rotatable platform for supporting articles to be coated, means for moving and rotating said platform, a rock shaft mounted in spaced relationship to said platform, an airbrush supported on said shaft in position to direct a coating onto said object, means for actuating said shaft whereby the axis of said airbrush orifice is shifted back and forth with respect to the surface of the object being coated, and means for securing said platform against rotation during the coating operation.

5. In a machine for air coating irregularly shaped objects, the combination of a moving, rotatable platform for supporting articles to be coated, means for moving and rotating said platform, a rock shaft mounted in spaced relationship to said platform, an airbrush supported on said shaft in position to direct a coating onto said object, means for actuating said shaft whereby the axis of said airbrush orifice is shifted back and forth with respect to the surface of the object being coated, and for adjustably positioning said airbrush on said shaft so as to locate said airbrush orifice concentrically or eccentrically of the center of said shaft in position to direct a coating onto said object, and means for securing said platform against rotation during coating of said objects.

6. In a machine for air coating objects, the combination of a supporting framework, a moving, rotatable platform for supporting articles to be coated, means for moving and rotating said platform, a rock shaft mounted in spaced relationship to said platform, a crank rod offset from said rock shaft, means for actuating said rock shaft, means for adjustably positioning an airbrush on said crank rod so as to locate the discharge orifice concentrically or eccentrically of the center of said rock shaft in position to direct a coating onto said object and means for moving said platform transversely of the axis of the orifice of said airbrush, means for preventing rotation of said platform in the effective range of said airbrush.

7. In a machine for air coating objects, the combination of a conveyor arranged to move objects through a predetermined path, platforms rotatably mounted on said conveyor for supporting objects to be coated, means for rotating said platforms, a rock shaft journaled on an axis parallel to the travel of said conveyor, a pair of airbrushes mounted on said rock shaft and spaced apart from each other axially of said shaft with their respective discharge orifice axes converging toward the object to be coated whereby one of said airbrushes coats the advancing surface of the object and the other airbrush coats the trailing surface of said object, means for actuating said rock shaft, and means for securing said platforms against rotation in the painting range of said airbrushes.

8. In a machine for air coating objects, the combination of a supporting framework, a conveyor for moving objects along a predetermined path, platforms for supporting said objects rotatably mounted on said conveyor, a rock shaft journaled on said housing with its axis parallel to the travel of said conveyor, means for actuating said shaft, pairs of airbrushes mounted on said rock shaft to provide two air painting stations spaced apart axially of said shaft with the airbrushes at each station being positioned so that the axes of the discharge orifices converge toward the object to be coated, coacting means on said framework and said platforms for effecting a 180-degree rotation of each of said platforms at a point in the interval of passage between said stations, means for securing said platforms against rotation during air coating, valve mechanisms controlling the airbrushes for each station located adjacent the path of said conveyor, and means on said conveyor positioned relative to each of said platforms for actuating said valve mechanisms so as to disable said airbrushes during the rotation of said platforms.

9. A system for air coating moving objects, which comprises a painting chamber wherein pairs of airbrushes are arranged to constitute two painting stations, a conveyor for moving objects through said chamber past said stations, means for rotating each of said objects at a point in the interval of travel between said stations and at a point after the coating of each object is completed, and means for substantially preventing rotation of said objects when in the range of said painting stations.

10. A system for air coating moving objects, which comprises a painting chamber wherein pairs of airbrushes are reciprocatingly mounted in said chamber and arranged to provide two painting stations, each airbrush having an orifice directed at the moving objects and in converging relation with respect to the paired airbrush, means for mounting and reciprocating said airbrushes so that the axes of the orifices are shifted back and forth across the surface of the object to be coated, a conveyor for moving objects through said chamber past said stations, means for rotatably supporting said objects on said conveyor, and means for simultaneously disabling said airbrushes and rotating each of said objects at points intermediate said stations and after the coating of each object is completed.

JENS A. PAASCHE.

REFERENCES CITED

The following references are of record in the file of this patent:

UNITED STATES PATENTS

| Number | Name | Date |
| --- | --- | --- |
| 1,124,858 | Caruso et al. | Jan. 12, 1915 |
| 2,069,844 | Paasche | Feb. 9, 1937 |
| 2,072,948 | Geffs | Mar. 9, 1937 |
| 2,261,138 | Bullerjohn | Nov. 4, 1941 |
| 2,342,375 | Shurley | Feb. 22, 1944 |
| 2,373,604 | Schweitzer | Apr. 10, 1945 |